C. P. Carter.
Apple Parer.
No. 385. Reissued Aug. 12. 1856.
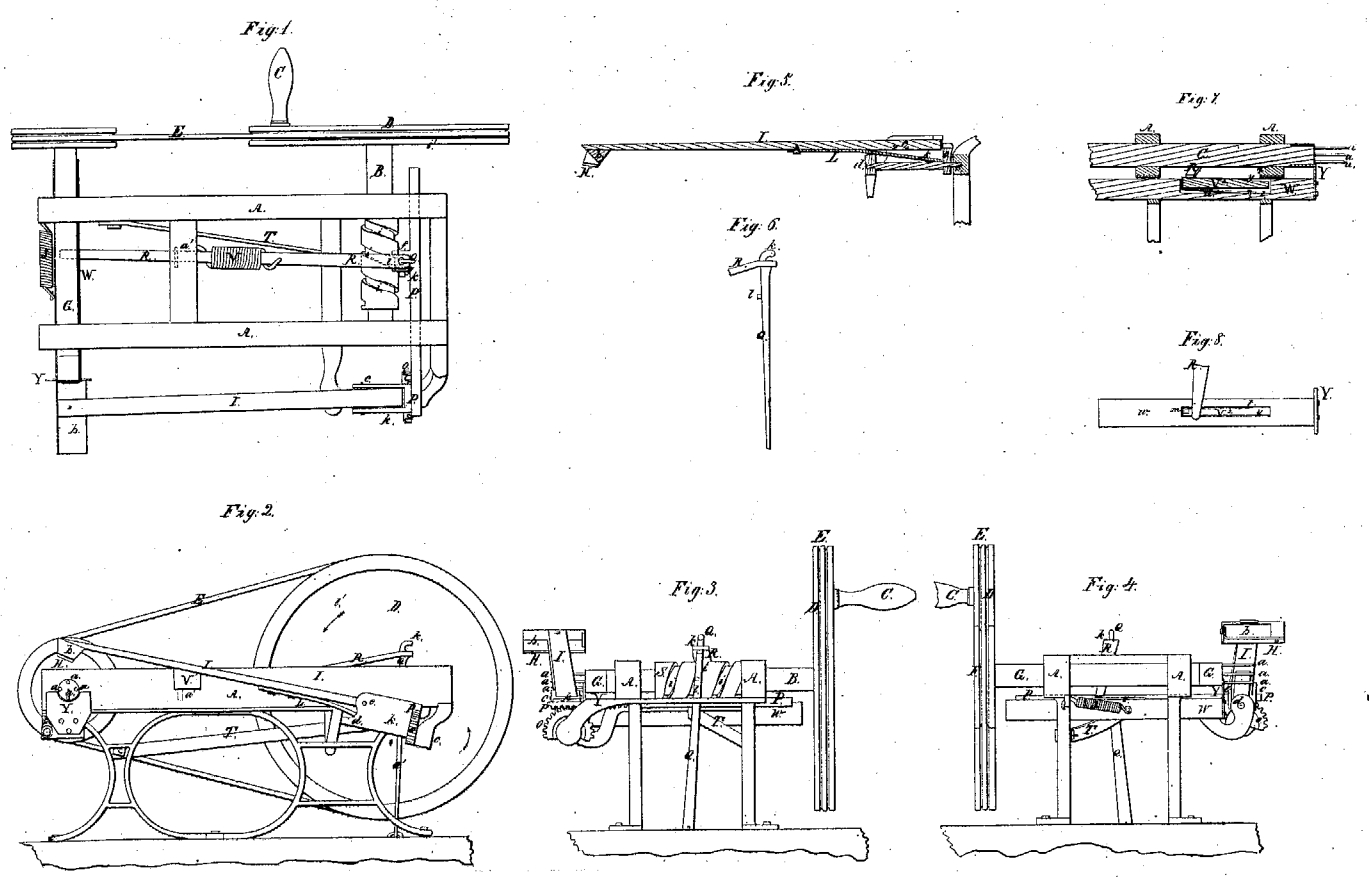
N. PETERS, PHOTO-LITHOGRAPHER, WASHINGTON, D. C.

UNITED STATES PATENT OFFICE.

CHARLES P. CARTER, OF WARE, MASSACHUSETTS.

IMPROVEMENT IN APPLE-PARERS.

Specification forming part of Letters Patent No. 6,789, dated October 16, 1849; Reissue No. 385, dated August 12, 1856.

*To all whom it may concern:*

Be it known that I, CHARLES P. CARTER, of Ware, in the county of Hampshire and State of Massachusetts, have invented a new and useful or Improved Machine for Paring Apples or Various other Fruits or Vegetables; and I do hereby declare that the same is fully described and represented in the following specification and accompanying drawings, letters, figures, and references thereof.

Of the said drawings, Figure 1 denotes a top view of my said machine; Fig. 2, a side elevation; Fig. 3, an elevation or view of one end; Fig. 4, an elevation of the other end.

A in the drawings represents the framework by which the operative parts are supported in place. B is the driving-shaft, which may be rotated by the hand of a person applied to a crank, C, extending from one side of a grooved wheel, D, which is fixed on the outer extremity of the shaft, and has around its periphery an endless belt, E. This belt passes around the grooved circumference of a wheel, F, fixed on another shaft, G, which shaft, by means of four or any other suitable number of prongs, *a a a a*, is made to sustain the apple, it being pressed against the prongs so as to cause them to enter it and pass longitudinally through its core. When the shaft G is revolved, the apple will be rotated with and by it. The paring-knife is seen at H. It is affixed to the cross-head *b* of a long lever, I, which turns on a fulcrum or pin, *c*, extending through it, and a socket-piece, K, as seen particularly in Fig. 5, which is a longitudinal section of the said lever and socket-piece. A spring, L, properly connected to the lever and its socket-piece serves to press the knife against the apple, and to permit it to conform itself to the irregularities thereof during the operation of paring it. The socket-piece K is supported by journals *d e*, which rest and revolve in a lateral direction in bearings made in the outer ends of two arms, which are arranged and made to project from the side of the frame A, as seen in the drawings. Between one of the bearings and the socket-piece and attached to them is a toothed sector, O, which engages with a horizontal sliding rack-bar, P, so adapted to the frame A as to be capable of being moved both forward and backward in a longitudinal direction. This rack-bar P has two ears, *f g*, extending inward from one edge of it, and at a suitable distance apart to receive between them and permit to vibrate transversely of the machine a lever, Q, whose fulcrum is at its lower end, and which is jointed at its upper end to one end of a long bar, R—that is to say, said lever has a hook, K, which passes through a hole made downward through the bar. A small pin or stud, *l*, extends from the inner side of the lever Q, as seen in Fig. 6, which is a side view of the lever as it would appear when detached from the machine. The said stud is made to enter a helical or screw groove, *i*, cut in and round the surface of a cylinder, S, fixed on the driving-shaft B, and rotated by it. At that end of the cylinder S which is nearest to the socket-piece K the bottom of the helical groove runs out even with the surface of the cylinder, so that when the pin or stud reaches the same it will pass out of the groove and upon the said surface of the cylinder. When the driving-shaft is revolved in the direction denoted by the arrow *l'* in Fig. 2, it will so revolve the helical groove as to press or move the lever Q toward the socket-piece K, thereby at the same time causing the rack-bar to be moved horizontally by the lever. In consequence of this the teeth of the rack-bar, by their action in the sector O, will impart a lateral rotation to the sector and the lever I, and thereby cause the cutting-knife to keep itself in proper contact with the surface of the apple to the degree necessary to remove the entire peel of it in one continous strip or shaving.

In order that the knife may accommodate itself to the uneven surface of the apple or other article to be pared more easily and exactly than could take place were it held rigidly and only permitted to move as it was guided by the rack-bar P and sector O, it is necessary that it be capable of a slight play around its axis independent of the motion imparted to it by the machinery which actuates it. This I accomplish in the following manner: The ears *f* and *g*, which project from the bar P and embrace the lever Q, are at a distance from each other somewhat greater than the width of the lever, whereby the bar is allowed a slight play independent of the lever Q. As this bar is connected with the knife-arm I by means of the sector O, it is evident that this arm will be allowed to play a corresponding amount around its axis, and thus the knife is allowed to accommodate itself to the uneven surface of the apple, as required.

For the purpose of more effectually securing the desired play of the knife, the cogs of the sector O and rack-bar P are made smaller than the spaces in which they play, and thus the knife and its arm are allowed the necessary motion independent of the sector. Either one or both of these methods, or any equivalent device, may be adopted for the purpose. As soon as the removal of the peel has been effected, the stud *l* reaches the termination of the helical groove and passes out of the groove onto the surface of the cylinder S, so as to permit a retractive spring, T, to throw or move the lever toward the opposite end of the cylinder, and thereby move the rack-bar and other parts connected with it so as to restore the cutting-knife to the position it should have in order for it to commence to cut on another apple.

In order to prevent the pin *l* from being drawn into or entering the helical groove during its back movement over the surface of the cylinder, and until it reaches the other end of said groove, the bar R, before mentioned, (and which has one end of a spring, V, attached to it, whose other end is attached to a cross-tie, V′, of the frame A, the said spring being for the purpose of drawing the lever Q toward the cylinder S,) is received in a notch, *m*, (see Fig. 8,) of a bar, $V^2$, which is connected with a slide-bar, W. This operation will be more fully explained after the description of the apparatus or part of the machine by which the apple, after it has been pared, is discharged or thrown off from the prongs by which it is sustained during the operation of removing its skin. The bar W is suitably supported, so as to be capable of being moved longitudinally of itself and transversely of the machine. On that end of it which is immediately underneath the prongs *a a*, before mentioned, it has a vertical plate, Y, which is carried up in rear of the apple, and by being pressed against it during the forward movement of the bar W discharges it from the prongs. The said forward movement of the bar W is effected by means of the action of the long bar R against the bar $V^2$. This bar $V^2$ lies in a groove or recess, *t*, (see Fig. 7, which is a vertical longitudinal section of the slide-bar W, and the parts of the machine which are situated directly over it,) made down in the bar W, and it is forced upward by means of a spring, *u*, arranged under it, as seen in Fig. 7. While the slide-bar W is being moved forward, the spring-bar $V^2$ will be depressed into its recess by means of the part *x* of the framework, the top surface of the bar $V^2$ being so formed with a slope, Y, as to cause the depression of the bar to be gradual. A retractive spring, Z, is fixed to the bar W and the frame A.

In Fig. 8, which is a top view of the slide-bar W, the bars R and $V^2$ exhibit the notch *m*, before mentioned. The bar R passes through a staple, *a′*, drawn up into the under side of the cross-tie V′, the said staple serving for a fulcrum for it. Now, when the pin *l* escapes from the spiral groove *i* and the bar R is retracted by its spring T, that end of the bar which is in the notch *m* upon the end of the spring-bar $V^2$ presses against the end of this spring-bar, and thereby shoots the bar W suddenly, so as to discharge the apple from the prongs *a a*. It will be seen, also, that when the stud or pin of the lever Q is in the act of leaving the helical groove, the bar R will have a longitudinal motion imparted to it, such as will cause its end which is contiguous to the bar $V^2$ to pass into the notch *m*. This notch *m*, therefore, so long as the end of the bar R remains in it, will keep the stud *l* from entering the helical groove. The depression of the spring-bar $V^2$, however, by the part *x*, releases the end of the bar R from the notch, and thereby permits the pin to again enter the helical groove at the proper time.

I lay no claim to the invention of the combination of a rotating apple holder or shaft, and a knife fixed to a bar whose movements, in order to keep the knife against the surface of the apple during the operation of removing the peel, are directed by the hand of a person applied to it; but What I do claim as my invention, and desire to secure by Letters Patent, is—

1. The combination of the spiral groove *i*, the rack-bar P, and sector O, or their equivalents, for the purpose of moving the knife automatically, in the manner and for the purpose herein set forth.

2. The combination of the spiral groove *i*, the lever R, and the sliding bar W, or their equivalents, constructed and operating in the manner substantially as herein described, for the purpose of throwing the apple from the prongs after the paring is completed, as set forth.

3. Giving to the knife a slight play around its axis independent of the mechanism which actuates it, for the purpose herein set forth.

CHAS. P. CARTER.

Witnesses:
WM. C. APPLETON,
SAM. COOPER.